United States Patent
Binette et al.

(10) Patent No.: US 9,504,878 B2
(45) Date of Patent: *Nov. 29, 2016

(54) RECYCLABLE GOLF BALL AND METHOD OF MAKING

(71) Applicant: Acushnet Company, Fairhaven, MA (US)

(72) Inventors: Mark L. Binette, Mattapoisett, MA (US); John D. Farrell, Providence, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/667,988

(22) Filed: Mar. 25, 2015

(65) Prior Publication Data

US 2016/0279479 A1 Sep. 29, 2016

(51) Int. Cl.
*A63B 37/00* (2006.01)
*C09D 123/08* (2006.01)
*C08F 210/02* (2006.01)
*C08F 220/06* (2006.01)

(52) U.S. Cl.
CPC ......... *A63B 37/004* (2013.01); *A63B 37/0022* (2013.01); *A63B 37/0039* (2013.01); *A63B 37/0045* (2013.01); *A63B 37/0075* (2013.01); *C08F 210/02* (2013.01); *C08F 220/06* (2013.01); *C09D 123/0876* (2013.01)

(58) Field of Classification Search
CPC .............................................. C09D 123/0876
See application file for complete search history.

(56) References Cited

U.S. PATENT DOCUMENTS

| | | | |
|---|---|---|---|
| 5,300,325 A | 4/1994 | Nealon et al. | |
| 5,466,424 A | 11/1995 | Kusano et al. | |
| 5,907,012 A | 5/1999 | Voss et al. | |
| 6,117,025 A * | 9/2000 | Sullivan | A63B 37/0003 473/373 |
| 6,213,895 B1 * | 4/2001 | Sullivan | A63B 37/0003 473/351 |
| 6,277,921 B1 * | 8/2001 | Sullivan | A63B 37/0003 525/196 |
| 6,325,731 B1 * | 12/2001 | Kennedy, III | A63B 37/0003 473/377 |
| 6,585,607 B2 | 7/2003 | Tzivanis et al. | |
| 6,905,423 B2 | 6/2005 | Morgan et al. | |
| 7,198,576 B2 | 4/2007 | Sullivan et al. | |
| 7,241,232 B2 | 7/2007 | Sullivan et al. | |
| 7,244,196 B2 | 7/2007 | Kennedy, III et al. | |
| 7,338,391 B2 | 3/2008 | Melanson et al. | |
| 7,396,300 B2 | 7/2008 | Tzivanis et al. | |
| 7,534,384 B2 | 5/2009 | Tzivanis et al. | |
| 8,475,881 B1 | 7/2013 | Melanson et al. | |
| 8,907,022 B2 | 12/2014 | Hayes et al. | |
| 9,427,629 B1 * | 8/2016 | Binette | A63B 37/0003 |
| 2005/0037866 A1 | 2/2005 | Emerson et al. | |
| 2009/0143170 A1 | 6/2009 | Ohira et al. | |
| 2011/0244983 A1 | 10/2011 | Shen et al. | |
| 2013/0059972 A1 * | 3/2013 | Hayes | C08J 3/05 524/562 |
| 2013/0165267 A1 | 6/2013 | Molinari | |
| 2013/0324324 A1 | 12/2013 | Ishii et al. | |

* cited by examiner

Primary Examiner — David Buttner
(74) Attorney, Agent, or Firm — Margaret C. Barker

(57) ABSTRACT

Golf ball comprising a non-dissolvable layer having a spherical outer surface; and a dissolvable tie layer or dissolvable layer, dispersible in water heated to a heating temperature of about 80° C.-90° C. or greater, disposed concentrically about the spherical outer surface and being bonded with the first non-dissolvable layer at an interface there between. The dissolvable tie layer/dissolvable layer may be formed from a composition consisting of a 1-50 percent aqueous mono-valent high acid ionomer dispersion, or, from an ionomer resin composition. The ionomer of either composition has an acid level greater than 18%; has more than 45% of acid groups that are neutralized with a monovalent cation; and is formed from an acid copolymer having a starting melt index of greater than 180 g/10 min. @ 190° C. with a 2160 g load. The dissolvable tie layer/dissolvable layer may have a thickness of less than about 0.010 inches, and up to about 0.090 inches in some embodiments.

6 Claims, No Drawings

RECYCLABLE GOLF BALL AND METHOD OF MAKING

FIELD OF THE INVENTION

Golf balls that display excellent adhesive strength and durability during play yet are simply and cost effectively recyclable, and methods of making and/or recycling such golf balls.

BACKGROUND OF THE INVENTION

Golf balls are made in a variety of constructions and compositions. Generally, a core is surrounded by a cover, with at least one intermediate layer optionally disposed there between. Examples of golf ball materials range from balata to polybutadiene, ionomer resins, polyurethanes, and/or polyureas. Typically, outer layers are formed about the spherical outer surface of an inner golf ball layer via compression molding, casting, or injection molding. Coating layers are also sometimes applied about one or more golf ball layers.

Golf balls may be constructed with an eye toward maximizing adhesion between adjacent layers. Excellent adhesion between golf ball layers creates impact durability and shear resistance, without which both golf ball appearance and playability commonly suffer.

However, separating these layers from each other later, during the recycling process, can therefore be complex and difficult. Centerless grinding, while capable of removing covers and/or core layers, is costly. And chemical processes for removing paint and cover layers are dangerous, and therefore not the most practical approaches to recycling golf balls. Meanwhile, simply grinding the entire golf ball into a regrind stream of small mixed materials is less desirable, since it precludes isolating each material for subsequent addition into the virgin waste stream in certain percentages.

Thus, there remains a need for golf balls formed from adjacent layers that display excellent adhesive strength during play on the course yet are separable easily and cost-effectively later during the recycling process. The inventive golf ball, method of making golf balls, and golf ball recycling method address and solve this need.

SUMMARY OF THE INVENTION

Accordingly, in one embodiment, the invention is directed to a golf ball comprising a first non-dissolvable layer having a first spherical outer surface; a dissolvable tie layer disposed concentrically about the first spherical outer surface and being bonded with the first layer at an interface there between; and a second non-dissolvable layer disposed concentrically about a second spherical outer surface of the dissolvable tie layer and being bonded with the dissolvable tie layer at an interface there between. The dissolvable tie layer has a thickness of less than about 0.010 inches, and is formed from a tie layer composition consisting of a 1-50 percent aqueous mono-valent high acid ionomer dispersion.

In the tie layer composition, the ionomer: (i) has an acid level greater than 18%; (ii) has more than 45% of acid groups that are neutralized with a monovalent cation; and (iii) is formed from an acid copolymer having a starting melt index of greater than 180 g/10 min. @ 190° C. with a 2160 g load. The dissolvable tie layer is dispersible in water heated to a heating temperature of about 80° C.-90° C. or greater. The first non-dissolvable layer and the second non-dissolvable layer are different than the dissolvable tie layer at least in that they are not dispersible in water at the heating temperature.

In one embodiment, the first non-dissolvable layer and the second non-dissolvable layer are different. In another embodiment, the first layer and the second layer are substantially similar.

In one construction, the first non-dissolvable layer comprises a core, the dissolvable tie layer comprises an inner cover layer, and the second non-dissolvable layer comprises an outer cover layer. In another construction, the first non-dissolvable layer comprises an inner cover layer, the dissolvable tie layer comprises a second inner cover layer, and the second non-dissolvable layer comprises an outer cover layer. In yet another embodiment, the first non-dissolvable layer comprises an inner cover layer, the dissolvable tie layer comprises an outer cover layer, and the second non-dissolvable layer comprises a coating formed about the dissolvable tie layer.

The dissolvable tie layer may be formed about the spherical outer surface of the first non-dissolvable layer by at least one of dipping, soaking, rolling, wiping, spraying, coating, or brushing.

In one embodiment, the monovalent cation is selected from the group consisting of Na, Li, and K.

In another embodiment, a golf ball of the invention comprises a first non-dissolvable layer having a spherical outer surface; a dissolvable layer disposed concentrically about the spherical outer surface and being bonded with the first non-dissolvable layer at an interface there between. The dissolvable layer is formed from a layer composition consisting of a mono-valent high acid ionomer dispersion, wherein the ionomer of the layer composition: (i) has an acid level greater than 18%; (ii) has more than 45% of acid groups that are neutralized with a monovalent cation; and (iii) is formed from an acid copolymer having a starting melt index of greater than 180 g/10 min. @ 190° C. with a 2160 g load. The dissolvable layer is dispersible in water heated to a heating temperature of up to about 80° C.-90° C. or greater; and the first non-dissolvable layer is different than the dissolvable layer at least to the extent that it is non-dispersible in water at the heating temperature.

In this embodiment, the dissolvable layer may be very thin, having a thickness of less than about 0.010 inches, and may be formed about the spherical outer surface of the first non-dissolvable layer using the same methods as described above with respect to the dissolvable tie layer, i.e., dipping, soaking, etc.

In other embodiments, the dissolvable tie layer and/or dissolvable layer may alternatively be formed directly from an ionomer resin composition rather than from the dispersion. Similar to the dispersion, the ionomer of the resin composition: (i) has an acid level greater than 18%; (ii) has more than 45% of acid groups that are neutralized with a monovalent cation; and (iii) is formed from an acid copolymer having a starting melt index of greater than 180 g/10 min. @ 190° C. with a 2160 g load; and is dispersible in water heated to a heating temperature of about 80° C.-90° C. or greater.

Where the dissolvable tie layer and/or dissolvable layer is formed from a resin composition rather than from the dispersion, the thickness of the layer may in some embodiments be up to about 0.090 inches. Furthermore, such a layer may be formed about the spherical outer surface by at least one of compression molding, casting, and injection molding as well as by dipping, soaking, etc.

For example, a golf ball of the invention may comprise a dissolvable golf ball layer, as defined hereinbelow, that is dispersible in water heated to a heating temperature of about 80° C.-90° C. or greater. A dissolvable golf ball layer includes a dissolvable tie layer and/or dissolvable layer and is disposed concentrically about a spherical outer surface of a first non-dissolvable layer and is bonded with the first non-dissolvable layer at an interface there between. The dissolvable golf ball layer (dissolvable tie layer/dissolvable layer) is formed from (i) a composition consisting of a 1-50 percent aqueous mono-valent high acid ionomer dispersion, or, alternatively, (ii) an ionomer resin composition. The ionomer of either composition has an acid level greater than 18%; has more than 45% of acid groups that are neutralized with a monovalent cation; and is formed from an acid copolymer having a starting melt index of greater than 180 g/10 min. @ 190° C. with a 2160 g load.

The dissolvable golf ball layer formed from the ionomer dispersion or ionomer resin composition are each advantageously soluble in water under specific heating conditions, contrary to ionomers in general, which are typically non-soluble in water.

In a different embodiment, the invention is directed to a golf ball formed from the steps comprising: (a) providing a dissolvable tie layer composition consisting of a 1-50 percent aqueous mono-valent high acid ionomer dispersion; wherein the ionomer of the tie layer composition: (i) has an acid level greater than 18%; (ii) has more than 45% of acid groups that are neutralized with a monovalent cation; and (iii) is formed from an acid copolymer having a starting melt index of greater than 180 g/10 min. @ 190° C. with a 2160 g load; and wherein the dissolvable tie layer is dispersible in water that is heated to a heating temperature of up to about 80° C.-90° C. or greater; (b) providing a first non-dissolvable layer having a first spherical outer surface and not comprising the dissolvable tie layer composition; (c) exposing the first spherical outer surface to the dissolvable tie layer composition and forming a dissolvable tie layer concentrically about the first spherical outer surface such that the first non-dissolvable layer and the dissolvable tie layer are bonded at an interface there between; and (d) forming a second non-dissolvable golf ball layer concentrically about an outer surface of the dissolvable tie layer such that the second non-dissolvable layer and the dissolvable tie layer are bonded at an interface there between, the second non-dissolvable golf ball layer not comprising the dissolvable tie layer composition.

In this embodiment, the dissolvable tie layer is dispersible in water heated to the heating temperature, whereas the first non-dissolvable layer and the second non-dissolvable layer are different than the dissolvable tie layer at least to the extent that each are non-dispersible in water at the heating temperature.

In one embodiment, the step of exposing the outer surface to the tie layer composition may comprise at least one process step selected from the group consisting of dipping, soaking, rolling, wiping, spraying, coating, brushing. Further, the second non-dissolvable golf ball layer may be formed about the tie layer during a molding process selected from the group consisting of compression molding; injection molding; and casting. Of course, it is contemplated that each of these steps may be performed using numerous other methods known in the golf ball art for forming outer layers about inner layers.

Alternatively, the invention is directed to a golf ball formed from the steps comprising: (a) providing a dissolvable layer composition consisting of a 1-50 percent aqueous mono-valent high acid ionomer dispersion; wherein the ionomer of the tie layer composition: (i) has an acid level greater than 18%; (ii) has more than 45% of acid groups that are neutralized with a monovalent cation; and (iii) is formed from an acid copolymer having a starting melt index of greater than 180 g/10 min. @ 190° C. with a 2160 g load; (b) providing a first non-dissolvable layer having a first spherical outer surface and not comprising the dissolvable layer composition and not being dispersible in water heated to a heating temperature of up to about 80° C.-90° C. or greater; (c) providing the dissolvable layer composition about the first spherical outer surface and forming a dissolvable layer concentrically about the first spherical outer surface such that the first non-dissolvable layer and the dissolvable layer are bonded at an interface there between.

In this embodiment, the dissolvable layer has an outer surface that may comprise an outermost surface of the golf ball; and the dissolvable layer is dispersible into water at the heating temperature.

In a different embodiment, the invention is directed to a golf ball formed from the steps comprising: (a) providing a dissolvable tie layer resin composition consisting of a monovalent high acid ionomer; wherein the ionomer of the dissolvable layer composition: (i) has an acid level greater than 18%; (ii) has more than 45% of acid groups that are neutralized with a monovalent cation; and (iii) is formed from an acid copolymer having a starting melt index of greater than 180 g/10 min. @ 190° C. with a 2160 g load; (b) providing a first non-dissolvable layer having a first spherical outer surface and not comprising the dissolvable tie layer composition and not being dispersible in water heated to a heating temperature of up to about 80° C.-90° C. or greater; (c) providing the dissolvable tie layer resin composition about the first spherical outer surface and forming a dissolvable tie layer concentrically about the first spherical outer surface such that the first non-dissolvable layer and the dissolvable tie layer are bonded at an interface there between; and (d) forming a second non-dissolvable golf ball layer concentrically about an outer surface of the dissolvable tie layer such that the second non-dissolvable layer and the dissolvable tie layer are bonded at an interface there between, the second non-dissolvable golf ball layer not comprising the dissolvable tie layer composition.

Alternatively, the invention is directed to a golf ball formed from the steps comprising: (a) providing a dissolvable layer resin composition consisting of a mono-valent high acid ionomer; wherein the ionomer of the dissolvable layer resin composition: (i) has an acid level greater than 18%; (ii) has more than 45% of acid groups that are neutralized with a monovalent cation; and (iii) is formed from an acid copolymer having a starting melt index of greater than 180 g/10 min. @ 190° C. with a 2160 g load; (b) providing a first non-dissolvable layer having a first spherical outer surface and not comprising the dissolvable layer composition and not being dispersible in water heated to a heating temperature of up to about 80° C.-90° C. or greater; (c) providing the dissolvable layer resin composition about the first spherical outer surface and forming a dissolvable layer concentrically about the first spherical outer surface such that the first non-dissolvable layer and the dissolvable layer are bonded at an interface there between.

Meanwhile, the invention is directed to a method of making a golf ball comprising: providing a first non-dissolvable layer; forming a dissolvable tie layer having a thickness of less than 0.010 in. concentrically about an outer surface of the first non-dissolvable layer; and forming a second non-dissolvable layer about an outer surface of the dissolvable tie layer; wherein: (a) the dissolvable tie layer is formed from a tie layer composition consisting of a 1-50 percent aqueous mono-valent high acid ionomer dispersion; (b) the ionomer of the tie layer composition: (i) has an acid level greater than 18%; (ii) has more than 45% of acid groups that are neutralized with a monovalent cation; and (iii) is formed from an acid copolymer having a starting melt index of greater than 180 g/10 min. @ 190° C. with a 2160 g load; and (c) wherein the first non-dissolvable layer and the second non-dissolvable layer are different than the dissolvable tie layer at least to the extent that each are non-dispersible in water at a heating temperature of about 80° C.-90° C. or greater, whereas the dissolvable tie layer is dispersible in water at the heating temperature.

This method may be modified such that the tie layer composition consists of a dissolvable tie layer resin composition, as discussed herein, rather than consisting of the dispersion.

In a different embodiment, the method of making a golf ball of the invention comprises: providing a first non-dissolvable layer; forming a dissolvable layer about an outer surface of the first non-dissolvable layer; wherein: (a) the dissolvable layer is formed from a layer composition consisting of a 1-50 percent aqueous mono-valent high acid ionomer dispersion; (b) the ionomer of the layer composition: (i) has an acid level greater than 18%; (ii) has more than 45% of acid groups that are neutralized with a monovalent cation; and (iii) is formed from an acid copolymer having a starting melt index of greater than 180 g/10 min. @ 190° C. with a 2160 g load; and (c) wherein the first non-dissolvable layer is different than the dissolvable layer at least to the extent that it is non-dispersible in water at a heating temperature of about 80° C.-90° C. or greater, whereas the dissolvable tie layer is dispersible in water at the heating temperature.

This method may be modified such that the dissolvable layer composition consists of a dissolvable layer resin composition, as discussed herein, rather than consisting of the dispersion.

The invention also relates to a method of recycling an inventive golf ball comprising the steps of: providing a golf ball comprising a dissolvable tie layer disposed between a first non-dissolvable layer and a second layer as disclosed herein; exposing the dissolvable tie layer to a heating temperature of about 80° C.-90° C. or greater to disperse the dissolvable tie layer composition into the water; and separating the dissolvable tie layer composition from the first non-dissolvable layer and the second layer.

The step of exposing the dissolvable tie layer to the heating temperature may comprise at least one of: (i) cross sectioning the golf ball and dipping and/or soaking the cross sectioned golf ball within the water; and (ii) penetrating the golf ball inward from the golf ball outer surface to a depth of the dissolvable tie layer and contacting the water with the dissolvable tie layer. In each of these approaches, the water may be either pre-heated to the heating temperature or heated to the heating temperature after the golf ball is sectioned or penetrated.

In a different embodiment, the method of recycling a golf ball comprises the steps of: providing a golf ball comprising a dissolvable layer disposed about a first non-dissolvable layer as disclosed herein; exposing the dissolvable layer to water to disperse the dissolvable layer composition into the water; and separating the dispersion and the first non-dissolvable layer. In this embodiment, the water may be pre-heated to a heating temperature of about 80° C.-90° C. or greater or alternatively, the water may be heated to the heating temperature after the golf ball is first exposed to the water.

DETAILED DESCRIPTION

In a golf ball of the invention, at least one of a "dissolvable tie layer" or a "dissolvable layer" is incorporated therein in order to improve/facilitate golf ball recyclability without sacrificing durability during play. The "dissolvable tie layer" is disposed intermediate between and adjacent to the first non-dissolvable layer and the second non-dissolvable layer, whereas a "dissolvable layer" is an outermost golf ball layer that surrounds an adjacent inner, non-dissolvable layer.

A dissolvable tie layer may comprise any golf ball component such as a core layer, an intermediate layer, and/or outer cover layer. As used herein, the term "core" refers to either a single piece core or a dual core (inner core portion surrounded by an outer core layer). Meanwhile, an "intermediate layer" is any golf ball layer disposed between the core and an outermost cover layer. It is also envisioned that in some embodiments, golf balls of the invention may have one or more coating layers disposed about a cover layer. In such embodiments, the cover layer may for example be a dissolvable tie layer between an inner cover layer and the coating layer.

In turn, any outermost golf ball layer may comprise a "dissolvable layer". And the term "dissolvable golf ball layer" as used herein, refers interchangeably to a dissolvable tie layer and/or dissolvable layer, depending on whether the dissolvable layer is the outermost golf ball layer or is surrounded by a non-dissolvable golf ball layer.

The dissolvable tie layer/dissolvable layer may have a thickness of less than about 0.010 inches, and when formed from the ionomer resin composition, may in certain embodiments have a thickness of up to about 0.090 inches.

In other non-limiting embodiments, the thickness of the dissolvable tie layer or dissolvable layer may be in the range of from about 0.0001 to about 0.010 inches, or in the range of from about 0.0005 to about 0.005 inches, or in the range of from about 0.001 to about 0.004 inches. Meanwhile, for a dissolvable tie layer/dissolvable layer formed from an ionomer resin composition, the thickness may be greater than about 0.010 inches.

The term "dispersion", as used herein, describes a free-flowing liquid wherein solids are not visible to the human eye. The dissolvable tie layer/dissolvable layer of a golf ball of the invention incorporates ionomers which readily form aqueous dispersions when mixed with hot water under low shear conditions rather than requiring significantly more rigorous conditions such as high pressure, high shear, autoclave processes or extrusion processes, etc. and longer time periods to transition into the liquid phase.

The ionomer dispersion may comprise from about 1 wt. % to about 50 wt. % ionomer solids based on the total weight of the ionomer composition. In an alternative embodiment, the ionomer dispersion may comprise from about 5 wt. % to about 30 wt. % ionomer solids based on the total weight of the ionomer composition. In yet another embodiment, the ionomer dispersion may comprise from about 10 wt. % to about 20 wt. % ionomer solids based on the total weight of the ionomer composition.

The neutralizing agents for ionomer may be for example, Na, Li, K, or amine-type bases in the form of hydroxides, salts, carbonates, amines, ammonium hydroxides, or mixtures thereof.

As used herein, the term bond or bonded when used in connection with the dissolvable tie layer/dissolvable layer refers to the dissolvable tie layer/dissolvable layer interacting with an adjacent non-dissolvable golf ball layer at an interface there between so as to create desirable adhesion or adhesive strength between the dissolvable tie layer/dissolvable layer and the adjacent non-dissolvable layer. Such interaction may for example involve crosslinking between the tie layer and different layer, or fusion, etc. However, it is contemplated that the term "interact" relates and extends to any known mechanism for creating strong adhesion between golf ball layers.

Meanwhile, the only true limitation with respect to materials for an adjacent non-dissolvable layer is that such may not be dispersible in water at the heating temperature of about 80° C. to about 90° C. or greater. Thus, a first or second non-dissolvable layer may comprise an ionomeric material as long as such will not so dissolve when exposed to water at the heating temperature.

A dissolvable tie layer may advantageously be disposed between any two non-dissolvable golf ball layers. For example, in one embodiment, the dissolvable tie layer may comprise an outer core layer disposed between a non-dissolvable inner core and a non-dissolvable cover. In another embodiment, the dissolvable tie layer may comprise an intermediate core layer disposed between a non-dissolvable inner core and a non-dissolvable outer core layer. In yet another embodiment, the dissolvable tie layer may comprise an intermediate layer disposed between a non-dissolvable outer core layer and a non-dissolvable cover. In particular embodiment, the dissolvable tie layer/intermediate layer comprises an inner cover layer disposed between a non-dissolvable core and a non-dissolvable outer cover layer. In an alternative embodiment, the dissolvable tie layer may comprise a cover disposed between a non-dissolvable intermediate layer and a non-dissolvable coating. The dissolvable tie layer may even comprise one coating layer disposed between a non-dissolvable cover and a non-dissolvable coating layer.

Meanwhile, non-limiting examples of suitable materials for a dissolvable tie layer/dissolvable layer of a golf ball of the invention are set forth in U.S. Pat. No. 8,907,022 of Hayes et al., hereby incorporated by reference herein in its entirety. The ionomer of the dissolvable tie layer/dissolvable layer may be derived from certain parent acid copolymers comprising copolymerized units of ethylene and from about 18 wt. % to about 30 wt. % of copolymerized units of an alpha, beta-ethylenically unsaturated carboxylic acid such as acrylic acid or methacrylic acid. Preferably, the parent acid copolymer used herein comprises about from about 19 wt. % to about 25 wt. %, or from about 19 wt. % to about 23 wt. % of the alpha, beta-ethylenically unsaturated carboxylic acid, based on the total weight of the copolymer.

The alpha, beta-ethylenically unsaturated carboxylic acid may be methacrylic acid. Of note are acid copolymers consisting essentially of copolymerized units of ethylene and copolymerized units of the alpha, beta-ethylenically unsaturated carboxylic acid and 0 wt. % of additional comonomers; that is, dipolymers of ethylene and the alpha, beta-ethylenically unsaturated carboxylic acid. Examples of acid copolymers are ethylene methacrylic acid dipolymers.

The parent acid copolymers may have a melt flow rate (MFR) of greater than 180 g/10 min. as measured by ASTM D1238 at 190° C. using a 2160 g load, or greater than about 180 g/10 min. as measured by ASTM D1238 at 190° C. using a 2160 g load, or of about 200 to about 1000 grams/10 min. as measured by ASTM D1238 @ 190° C. using a 2160 g load. A similar ISO test is ISO 1133. Alternatively, the parent acid copolymers may have MFR from a lower limit of 200, 250 or 300 to an upper limit of 400, 500, 600 or 2000. The melt flow rate of the parent acid copolymer provides ionomers with optimum physical properties while still allowing for rapid self-dispersion in hot water. Ionomers derived from parent acid copolymers with melt flow rates below about 180 grams/10 min. have minimal hot water self-dispersibility.

In some embodiments, blends of two or more ethylene acid copolymers may be used, provided that the aggregate components and properties of the blend fall within the limits described above for the ethylene acid copolymers. For example, two ethylene methacrylic acid dipolymers may be used such that the total weight % of methacrylic acid is from about 18 wt. % to about 30 wt. % of the total polymeric material and the melt flow rate of the blend is from about 180 to about 1000 grams/10 min.

The ionomers of the dissolvable tie layer/dissolvable layer composition are produced from the parent acid copolymers, wherein from about 45% to about 70%, or from about 50% to about 60%, such as about 60%, of the total carboxylic acid groups of the parent acid copolymers, as calculated for the non-neutralized parent acid copolymers, are neutralized to form carboxylic acid salts with sodium ions. The parent acid copolymers may be neutralized using methods disclosed in, for example, U.S. Pat. No. 3,404,134. Embodiments are also envisioned wherein 45% or greater of the total carboxylic acid groups of the parent acid copolymers, as calculated for the non-neutralized parent acid copolymers, are neutralized to form carboxylic acid salts with sodium ions.

The ionomers of the dissolvable tie layer/dissolvable layer composition combine the properties of being self-dispersible in hot water along with being thermoplastic, allowing for these compositions to form a layer that is dissolvable about the outer surface of a golf ball component by contacting the outer surface with the ionomer composition via dipping, spraying, etc.

The ionomers of the dissolvable tie layer/dissolvable layer composition have a melt flow rate (MFR) of at least 0.5 gram/10 min., such as about 1 to about 20 grams/10 min as measured by ASTM D1238 at 190° C. using a 2160 g load, or of about 1 to about 10 grams/10 min., or of about 1 to about 5 grams/10 min. The combination of the above described parent acid copolymer melt flow rates and the sodium neutralization levels provides ionomers which combine the properties of being easily self-dispersible in hot water and easily formed into a very thin dissolvable tie layer of about 0.010 inches or less about the first layer, as well as into conventional thicknesses that are easily recyclable.

In some embodiments, blends of two or more ionomers may be used, provided that the aggregate components and properties of the blend fall within the limits described above for the ionomers.

The aqueous mono-valent high acid ionomer dispersion may also contain additives and/or fillers known in the art, which may be added to the ionomer(s) before the dispersion is formed via polymer compounding such a extrusion or milling followed by pelletizing, or added directly into the ionomer dispersion under high shear conditions to ensure dispersion and exfoliation of the filler.

The additives may include, but are not limited to, processing aids, flow enhancing additives, lubricants, pigments, dyes, flame retardants, impact modifiers, nucleating agents, anti-blocking agents such as silica, thermal stabilizers, UV absorbers, UV stabilizers, surfactants, chelating agents, and coupling agents, wetting agents, coloring agents, optical brighteners, whitening agents such as titanium dioxide and zinc oxide, UV absorbers, hindered amine light stabilizers, defoaming agents, processing aids, surfactants, antioxidants, stabilizers, softening agents, plasticizers, impact modifiers, foaming agents, density-adjusting fillers, reinforcing materials, and compatibilizers.

The density-adjusting fillers can be added to modify the modulus, tensile strength, and other properties of the compositions. Examples of useful fillers include tungsten, zinc oxide, barium sulfate, calcium oxide, calcium carbonate, silica, and zinc carbonate. Generally, the additives will be present in the composition in an amount between about 1 wt. % and about 70 wt. % based on the total weight of the composition depending upon the desired properties.

The addition of hydrophobic microparticles such as fibers; whiskers; metal flakes; micaceous particles or nanoparticles to the ionomer dispersion creates a tortuous (random or non-linear) path across the layer reducing its moisture vapor transmission rate. The term microparticles refers to particulates having a particle size of about 1 micron to about 200 microns. Nanoparticles refer to particles having an average particle size less than 1 micron. Suitable microparticles and nanoparticles can be pigmented or non-pigmented, and include fibers, whiskers, and flaked metals such as aluminum flakes, iron oxide flakes, copper flakes, bronze flakes, and the like, and mixtures thereof. Preferred metal flakes include aluminum flakes and, more specifically, aluminum oxide flakes. Microparticles sized preferably about 5 microns to about 50 microns may be used. The aspect ratio of the flakes preferably may be about 50 to about 10,000.

Platelet-type fillers that are generally at least partially exfoliated (partially or completely) maximize barrier properties. Examples of other fillers that create a tortuous path or physical barrier for the water vapor or other gases include natural, synthetic or modified silicates. Examples of filler level in the ionomer composition include from about 0.1% to about 20%, or from about 0.5% to about 15%, or about 1.0% to about 10%, and may include one or more filler types.

The aqueous mono-valent high acid ionomer dispersion may further contain additives such as polyethylene glycol, waxes, bis-stearamide, minerals, and phthalate compounds. The aqueous mono-valent high acid ionomer dispersion may include stiffening agents as well.

In addition, the aqueous mono-valent high acid ionomer dispersion may include at least one fatty acid or salt thereof. The fatty acid is selected preferably from the group of stearic acid, behenic acid, erucic acid, oleic acid, linoelic acid, and dimerized derivatives, and mixtures thereof. In one version, the fatty acid or salt is added to the master batch prior to mixing the master batch with the ethylene acid copolymer. In another version, the fatty acid or salt is added after the master batch and ethylene acid copolymer have been mixed.

There are numerous suitable methods for preparing the aqueous mono-valent high acid ionomer dispersion. In one embodiment, the ionomer may be added to room temperature water under low shear conditions and then the temperature of the water slowly raised to the heating temperature of 80-90° C. or greater, increasing mixer speed as viscosity increases until all of the ionomer composition is dispersed. In another embodiment, the ionomer is slowly added to water that is pre-heated to the heating temperature under low shear conditions and mixing is continued until the dispersion is formed.

An excellent dispersion may be achieved when the ionomer and filler are pre-mixed together under high shear before dissolving in water. In another embodiment, may be added directly to the already formed dispersion under high shear conditions to ensure dispersion and exfoliation of the filler.

Blends of acid copolymers can be used as long as the blend melt index is >180 g/10'. For example, an acid co-polymer with a melt index of 150 g/10' can be blended with an acid co-polymer having a melt index of 300 g/10' at an appropriate ratio to ensure that the blend has a MI>180 g/10'. Meanwhile, of course, the acid level should be greater than 18%.

The, dissolvable tie layer/dissolvable layer may generally be formed about the first non-dissolvable layer by contacting the outer surface of the first non-dissolvable layer with the aqueous mono-valent high acid ionomer dispersion. Numerous specific methods or procedures are known in the art for performing a contacting step. For example, the tie layer composition or layer composition may be provided in a thickness of less than about 0.010 inches by, for example, by dipping, soaking, rolling, wiping, spraying, coating, brushing, dusting or otherwise treating or exposing the outer surface of the first non-dissolvable layer with/to the dissolvable tie layer composition/dissolvable layer composition. The outer surface may be at room temp when dipped, sprayed or otherwise contacted with the aqueous monovalent high acid ionomer dispersion. Alternatively, heating the outer surface before exposing the outer surface to the dispersion may facilitate drying and formation of the dissolvable tie layer about the first layer. A second or outermost non-dissolvable layer may be formed about, and adjacent to, the dissolvable tie layer.

The dispersion itself can be used at room temperature, or at an elevated temperature or any combination of the two. During over-molding of additional layers (such as the second non-dissolvable layer) about the dissolvable tie layer, the thin high acid ionomer composition will advantageously re-melt and form strong bonds/interactions with the first and second non-dissolvable layers at their respective interfaces.

A second non-dissolvable layer may be formed/applied about the dissolvable tie layer by any suitable technique injection molding, compression molding, casting, reaction injection molding (RIM), vacuum forming, powder coating, and the like. Normally, compression and injection molding techniques are used to make thermoplastic second layers, while RIM, liquid injection molding, and casting are used to make thermoset second layers, although it is contemplated that any method known in the art for forming a layer about a tie layer may be used.

For example, in a casting process, a polyurethane and/or polyurea composition may be dispensed into the cavity of an upper mold member. This first mold half has a hemispherical structure. Then, the cavity of a corresponding lower mold member is filled with the polyurea mixture. This second mold half also has a hemispherical structure. A ball cup holds the golf ball (core and overlying casing layer) under vacuum. After the polyurea mixture in the first mold half has reached a semi-gelled or gelled sate, the pressure is removed and the golf ball is lowered into the upper mold half containing the polyurea mixture. Then, the first mold half is inverted and mated with the second mold half containing polyurea mixture which also has reached a semi-gelled or gelled state. The polyurea mixtures, contained in the mold members that are mated together, form the golf ball cover. The mated first and second mold halves containing the polyurea mixture and golf ball center may be next heated so that the mixture cures and hardens. Then, the golf ball is removed from the mold and allowed to cool as needed.

For example, a polyurethane or polyurea second layer may be disposed immediately about the dissolvable tie layer so that the two are contiguous with each other. There is a tight interface between the second non-dissolvable layer and the dissolvable tie layer as well as between the first non-dissolvable layer and dissolvable tie layer. Such excellent adhesion contributes to and produces a durable golf ball when struck by a club face.

Advantageously, in a golf ball and/or method of the invention, the dissolvable tie layer composition may be applied or otherwise provided about the first non-dissolvable layer at any time including during the molding process for forming the first non-dissolvable layer itself and up to and including when the second non-dissolvable layer is formed about the first non-dissolvable layer. Of course, embodiments are also envisioned wherein the dissolvable tie layer composition is formed onto an inner surface of the second non-dissolvable layer sometime prior to being formed about the first non-dissolvable layer—e.g., where the second non-dissolvable layer is a molded part. During the molding process, the dissolvable tie layer composition will re-melt and form a strong bond with the adjacent non-dissolvable layer at the interface there between.

Golf balls made in accordance with this invention can be of any size, although the USGA requires that golf ball used in competition have a diameter of at least 1.68 inches and a weight of no greater than 1.62 ounces. For play outside of USGA competition, the golf balls can have smaller diameters and be heavier. For example, the diameter of the golf ball may be in the range of about 1.62 to about 1.80 inches.

Meanwhile, the diameters and thicknesses of each non-dissolvable golf ball layer may be selected and coordinated as known in the art for targeting and achieving desired playing characteristics or feel. For example, the core may have a diameter of from about 1.47 inches (in.) to about 1.62 in.; the intermediate/casing layer may have a thickness of from about 0.025 in. to about 0.090 in.; a core and intermediate/casing layer, combined, may have a diameter of from about 1.52 in. to about 1.65 in.; the cover may have a thickness of from about 0.015 in. to about 0.090 in.; and any coating layers may have a combined thickness of from about 0.1 µm to about 100 µm, or from about 2 µm to about 50 µm, or from about 2 µm to about 30 µm. Meanwhile, each coating layer may have a thickness of from about 0.1 µm to about 50 µm, or from about 0.1 µm to about 25 µm, or from about 0.1 µm to about 14 µm, or from about 2 µm to about 9 µm, for example.

In turn, the hardness of each non-dissolvable layer may also be so targeted and coordinated with that of the dissolvable tie layer/dissolvable layer. It is also recognized that hardness gradients may occur within and/or between each non-dissolvable and the dissolvable tie layer as desired.

Golf balls of the invention are easily recyclable and exhibit excellent durability yet may be manufactured cost effectively. A golf ball of the invention beneficially incorporates a dissolvable tie layer/dissolvable layer that may be formed using ionomers such as Ex. 1, Ex. 2, Ex. 3, and Ex. 4 of TABLE I below rather than ionomers such as C1, C2, C3, C5 or non-neutralized acid copolymer C4. These examples collectively demonstrate the advantageous relationship of acid level and melt index of the acid copolymer and the neutralization of the ionomer material for forming aqueous dispersions.

TABLE I

| | Acid Copolymer (AC) | | | | Water Dispersability | |
|---|---|---|---|---|---|---|
| Example | Type | % Methacrylic | MFR (g/10 min) | Neutralization (Na) | At 80° C. | At 90° C. |
| C 1 | AC-1 | 15 | 200 | 51 | — | No |
| C 2 | AC-1 | 15 | 200 | 70 | — | No |
| C 3 | AC-3 | 19 | 60 | 50 | — | No |
| C4 | AC-2 | 19 | 400 | 0 (non-ionomer) | — | No |
| C5 | AC-2 | 19 | 400 | 40 | — | No |
| Ex 1 | AC-4 | 19 | 250 | 60 | Yes | Yes |
| Ex 2 | AC-5 | 23 | 270 | 55 | — | Yes |
| Ex 3 | AC-2 | 19 | 400 | 50 | No | Yes |
| Ex 4 | AC-2 | 19 | 400 | 60 | Yes | Yes |

Referring to TABLE I, ionomers were produced from ethylene methacrylic acid copolymer base resins having a melt index range of 60 to 400 g/10' and a wt. % of methacrylic acid of 15 to 23%. The ionomers were neutralized with sodium hydroxide and percent neutralization levels were zero to 70%.

The examples illustrate the addition of non-neutralized acid copolymer (example C4) or ionomers to heated water using the following procedure to produce a 10 wt. % solid loading. Into a metal vessel is added an appropriate amount of distilled water. The vessel is slowly heated to the described temperature, and slow agitation is provided with an overhead paddle mixer. When the water reaches the desired temperature, the resin is added in one portion and the resulting mixture is stirred for a total of 20 minutes. The mixture is allowed to cool, and materials that formed dispersions with no visible solids are denoted as "yes" and materials that did not form a dispersion are denoted as "no" in TABLE I.

TABLE I indicates that ionomers prepared from acid copolymer with 15 wt. % methacrylic acid and a melt index of 200 g/10' did not form an aqueous dispersion using this described procedure even at higher levels of neutralization (comparative examples C1 and C2). Comparative example C3, produced from acid copolymers comprising about 19 wt. % methacrylic acid and a melt index of 60 g/10', also did not yield a dispersion despite being neutralized to a level of 50%.

Ionomers Ex. 3 and Ex. 4 involved an acid copolymer with the same wt. % of methacrylic acid of 19% but with a higher melt flow of 400 g/10' in the base resin and both produced good dispersions when neutralized to 50 and 60%. Ionomers with neutralization levels of 40% or less did not form dispersions, even when formed from an acid copolymer comprising about 19 wt. % methacrylic acid and having a melt index of 400 g/10' (Comparative examples C4 and C5). Dispersions were also easily produced from ionomers Ex. 1 and Ex. 2, further demonstrating the advantageous relationship of acid level and melt index of the acid copolymer and the neutralization of the ionomer material for forming aqueous dispersions.

A core layer in a golf ball of the invention, whether comprising a first or second non-dissolvable layer, may be solid, semi-solid, fluid-filled, or hollow, and the core may have a single-piece or multi-piece structure. A variety of materials may be used to make the core including thermoset compositions such as rubber, styrene butadiene, polybutadiene, isoprene, polyisoprene, trans-isoprene; thermoplastics such as ionomer resins, polyamides or polyesters; and thermoplastic and thermoset polyurethane and polyurea elastomers. In one embodiment, the core is a single-piece made from a natural or synthetic rubber composition such as polybutadiene. In other instances, a two-piece core is constructed; that is, there may be two core layers. For example, an inner core portion may be made of a first base rubber material and an outer core layer, which surrounds the inner core, may be made of a second base rubber material. The respective core pieces may be made of the same or different rubber materials. Cross-linking agents and fillers may be added to the rubber materials.

More particularly, materials for solid cores typically include compositions having a base rubber, a filler, an initiator agent, and a cross-linking agent. The base rubber typically includes natural or synthetic rubber, such as polybutadiene rubber. In one embodiment, the base rubber is 1,4-polybutadiene having a cis-structure of at least 40%. The polybutadiene can be blended with other elastomers such as natural rubber, polyisoprene rubber, styrene-butadiene rubber and/or other polybutadienes. Another suitable rubber that may be used in the core is trans-polybutadiene. This polybutadiene isomer is formed by converting the cis-isomer of the polybutadiene to the trans-isomer during a molding cycle. A soft and fast agent such as pentachlorothiophenol (PCTP) or ZnPCTP can be blended with the polybutadiene. These compounds may also function as cis-to-trans catalyst to convert some cis-1,4 bonds in the polybutadiene into trans 1,4 bonds.

Fillers, which may be used to modify such properties as the specific gravity (density-modifying materials), hardness, weight, modulus, resiliency, compression, and the like may be added to the core composition. Normally, the fillers are inorganic, and suitable fillers include numerous metals or metal oxides, such as zinc oxide and tin oxide, as well as barium sulfate, zinc sulfate, calcium carbonate, barium carbonate, clay, tungsten, tungsten carbide, silica, and mixtures thereof. Fillers may also include various foaming agents or blowing agents, zinc carbonate, regrind (recycled core material typically ground to about 30 mesh or less particle size), high-Mooney-viscosity rubber regrind, and the like. In addition, polymeric, ceramic, metal, and glass microspheres may be used.

In one embodiment, the core is a single-piece core having an outside diameter of about 1.20 to about 1.65 inches. Preferably, the single-piece core has a diameter of about 1.62 inches. The core generally makes up a substantial portion of the ball, for example, the core may constitute at least about 90% of the ball. Again, the hardness of the core may vary depending upon the desired properties of the ball. One non-limiting example of such a construction is as follows. The core may be a single-piece core having a diameter of at least about 1.58 inches; the dissolvable tie layer may have a thickness of less than about 0.010 inches; and the cover may have a thickness of less than about 0.050 inches.

In another embodiment, the core may include an inner core portion and surrounding outer core layer. This core structure may be referred to as a multi-core or two-piece core. The inner core portion and outer core layer together may be referred to as the "center" of the ball. In such balls having two-piece cores, the inner core portion may have a diameter of about 0.75 to about 1.30 inches, more preferably 1.00 to 1.15 inches, and be relatively soft (that is, it may have a compression of less than about 30.) Meanwhile, the outer core layer may have a thickness of about 0.20 to about 0.60 inches and be relatively hard (compression of about 70 or greater). That is, the two-piece core or "center" of the ball, which constitutes the inner core and outer core layer, may have a total diameter of about 1.50 to about 1.64 inches, more preferably 1.510 to 1.620 inches, and a compression of about 80 to about 115, more preferably 85 to 110.

In one instance, the core is a two-piece core having a total diameter of about 1.32 inches to about 1.62 inches and comprising an inner core portion having a diameter of about 0.90 inches to about 1.20 inches, and an outer core portion having a thickness of about 0.21 to about 0.36 inches. In such a construction, the dissolvable tie layer is formed about the outer surface of the outer core portion and preferably has a thickness of less than about 0.010 inches and may be formed from either of the ionomer resin composition or the dispersion, and the cover comprises one or more layers and preferably has a thickness of less than 0.050 inches, preferably less than about 0.040 inches. More preferably, the cover has a thickness of about 0.015 to 0.040 inches.

In one non-limiting embodiment, the core is a single piece core having a diameter of at least about 1.58 inches, or of at least about 1.60 inches; the dissolvable tie layer has a thickness of less than about 0.010 inches and may be formed from either of the ionomer resin composition or the dispersion; and the cover has a thickness of less than 0.090 inches, or less than about 0.040 inches. In yet another embodiment, this golf ball may comprise a cover having a thickness of from about 0.015 inches to about 0.040 inches.

In other embodiments, the dissolvable layer may be formed from the ionomer resin composition rather than from the dispersion. For example, in one embodiment, a golf ball of the invention comprises a single piece core comprising a polybutadiene composition and having a diameter of at least about 1.58 inches; surrounded by an inner cover layer that is formed about the outer surface of the single piece core by compression or injection molding and having a thickness of about 0.090 inches or less; which is surrounded by a soft outer cover layer having a hardness of less than about 65 Shore D and comprising at least one of a polyurethane, a polyurea or an ionomer composition. In an alternative embodiment, the core may be a multi-piece core.

In a different embodiment, the outermost cover layer is formed from the ionomer resin composition. For example, in one non-limiting embodiment, a golf ball of the invention comprises a single piece or multi-piece core having a diameter of from about 1.20 in. to about 1.65 in. and comprising a polybutadiene composition, surrounded by a single layer cover comprising the ionomer resin composition and having a thickness of up to about 0.90 inches.

The compression of the core portion is generally overall in the range of about 40 to about 110 and more preferably in the range of about 60 to about 100. In general, when the ball contains a relatively soft core, the resulting spin rate of the ball is relatively low. The compressive force acting on the ball is less when a club strikes the ball and compresses the cover against a relatively soft core. The club face does not fully interface and grasp the ball's surface and thus the initial spin rate on the ball is lower. On the other hand, when the ball contains a relatively hard core, the resulting spin rate of the ball is relatively high. As the club face strikes the ball, it is able to more fully interface and grasp the ball's surface and thus the initial spin rate of the ball is higher. In other embodiments, the overall coefficient of restitution ("COR") of cores of the present invention at 125 ft/s is at least 0.750, or at least 0.775 or at least 0.780, or at least 0.785, or at least 0.790, or at least 0.795, or at least 0.800. Cores are also known to comprise a variety of other materials that are typically also used for intermediate and cover layers. Intermediate layers may likewise also comprise materials generally used in cores and covers as described herein for example.

The cover material should impart durability, toughness and tear-resistance to the ball. For example, polyurethane/polyurea compositions can be used in the cover layer, because they can provide the cover with high durability as well as a soft feel. In other embodiments, the cover may be made of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers and blends thereof.

In one embodiment, ionomer resins that are not dissolvable in water heated up to from about 80° C. to about 90° C. can be used as the cover material. These cross-linked polymers contain inter-chain ionic bonding as well as covalent bonding. The ionomer resins include, for example, a copolymer of ethylene and an acid group such as methacrylic or acrylic acid. Metal ions such as sodium, lithium, zinc, and magnesium are used to neutralize the acid groups in the polymer. Commercially available ionomer resins are known in the industry and include numerous resins sold under the trademarks, Surlyn® (DuPont) and Escor® and Iotek® (Exxon). These ionomer resins are available in various grades and are identified based on the type of base resin, molecular weight, type of metal ion, amount of acid, degree of neutralization, additives, and other properties.

As discussed above, suitable cover materials include, but are not limited to, ionomer resins and blends thereof (e.g., Surlyn® ionomer resins and DuPont® HPF 1000 and HPF 2000, commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyurethanes; polyureas; copolymers and hybrids of polyurethane and polyurea; polyethylene, including, for example, low density polyethylene, linear low density polyethylene, and high density polyethylene; polypropylene; rubber-toughened olefin polymers; acid copolymers, e.g., (meth)acrylic acid, which do not become part of an ionomeric copolymer; plastomers; flexomers; styrene/butadiene/styrene block copolymers; styrene/ethylene-butylene-styrene block copolymers; dynamically vulcanized elastomers; ethylene vinyl acetates; ethylene methyl acrylates; polyvinyl chloride resins; polyamides, amide-ester elastomers, and graft copolymers of ionomer and polyamide, including, for example, Pebax® thermoplastic polyether block amides, commercially available from Arkema Inc; crosslinked trans-polyisoprene and blends thereof; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations thereof. In a particular embodiment, the cover is a single layer formed from a composition selected from the group consisting of ionomers, polyester elastomers, polyamide elastomers, and combinations of two or more thereof.

In a second embodiment, the cover may comprise a composition formed from a thermoplastic polyurethane, thermoset polyurethane, thermoplastic polyurea, or thermoset polyurea. More particularly, a polyurea composition can be used as the cover layer. In another version, the cover layer comprises a blend of from about 10% to about 90% by weight of the polyurea composition and from about 90% to about 10% of a polyurethane composition. In yet another embodiment, the cover layer comprises a blend of from about 10% to about 90% by weight of the polyurea composition and from about 90% to about 10% of another polymer or other material such as vinyl resins, polyesters, polyamides, and polyolefins.

Polyurethanes, polyureas, and blends and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

Polyurethane cover compositions that can be used include those formed from the reaction product of at least one polyisocyanate and at least one curing agent. The curing agent can include, for example, one or more diamines, one or more polyols, or a combination thereof. The at least one polyisocyanate can be combined with one or more polyols to form a prepolymer, which is then combined with the at least one curing agent. Thus, when polyols are described herein they may be suitable for use in one or both components of the polyurethane material, that is, as part of a prepolymer and in the curing agent. The curing agent includes a polyol curing agent preferably selected from the group consisting of ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(.beta.-hydroxyethyl)ether; hydroquinone-di-(.beta.-hydroxyethyl)ether; trimethylol propane; and combinations thereof.

Suitable polyurethane cover compositions also include those formed from the reaction product of at least one isocyanate and at least one curing agent or the reaction product of at least one isocyanate, at least one polyol, and at least one curing agent. Preferred isocyanates include those selected from the group consisting of 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, and combinations thereof. Preferred polyols include those selected from the group consisting of polyether polyol, hydroxy-terminated polybutadiene, polyester polyol, polycaprolactone polyol, polycarbonate polyol, and combinations thereof. Preferred curing agents include polyamine curing agents, polyol curing agents, and combinations thereof. Polyamine curing agents are particularly preferred. Preferred polyamine curing agents include, for example, 3,5-dimethylthio-2,4-toluenediamine, or an isomer thereof; 3,5-diethyltoluene-2, 4-diamine, or an isomer thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); and combinations thereof.

The cover composition is not limited by the use of a particular polyisocyanate. Suitable polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("H.sub.12MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate; and combinations thereof. Polyisocyanates are known to those of ordinary skill in the art as having more than one isocyanate group, e.g., di-, tri-, and tetra-isocyanate. Preferably, the polyisocyanate is selected from MDI, PPDI, TDI, and combinations thereof. More preferably, the polyisocyanate includes MDI. It should be understood that, as used herein, the term "MDI" includes 4,4'-diphenylmethane diisocyanate, polymeric MDI, carbodiimide-modified liquid MDI, combinations thereof and, additionally, that the diisocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate may have less than 14% unreacted NCO groups. Preferably, the at least one polyisocyanate has no greater than 8.5% NCO, more preferably from 2.5% to 8.0%, or from 4.0% to 7.2%, or from 5.0% to 6.5%.

The cover composition is not limited by the use of a particular polyol. In one embodiment, the molecular weight of the polyol is from about 200 to about 6000. Exemplary polyols include, but are not limited to, polyether polyols, hydroxy-terminated polybutadiene (including partially/fully hydrogenated derivatives), polyester polyols, polycaprolactone polyols, and polycarbonate polyols. Particularly preferred are polytetramethylene ether glycol ("PTMEG"), polyethylene propylene glycol, polyoxypropylene glycol, and combinations thereof. The hydrocarbon chain can have saturated or unsaturated bonds and substituted or unsubstituted aromatic and cyclic groups. Preferably, the polyol includes PTMEG. Suitable polyester polyols include, but are not limited to, polyethylene adipate glycol, polybutylene adipate glycol, polyethylene propylene adipate glycol, ortho-phthalate-1,6-hexanediol, and combinations thereof. The hydrocarbon chain can have saturated or unsaturated bonds, or substituted or unsubstituted aromatic and cyclic groups. Suitable polycaprolactone polyols include, but are not limited to 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and combinations thereof. The hydrocarbon chain can have saturated or unsaturated bonds, or substituted or unsubstituted aromatic and cyclic groups. Suitable polycarbonates include, but are not limited to, polyphthalate carbonate. The hydrocarbon chain can have saturated or unsaturated bonds, or substituted or unsubstituted aromatic and cyclic groups.

Polyamine curatives are also suitable for use in the curing agent of polyurethane compositions and have been found to improve cut, shear, and impact resistance of the resultant balls. Preferred polyamine curatives include, but are not limited to 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and combinations thereof. Preferably, the curing agent includes 3,5-dimethylthio-2,4-toluenediamine and isomers thereof, such as ETHACURE 300. Suitable polyamine curatives, which include both primary and secondary amines, preferably have weight average molecular weights ranging from about 64 to about 2000.

At least one of a diol, triol, tetraol, or hydroxy-terminated curative may be added to the polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy) ethoxy]ethoxy}benzene; 1,4-butanediol; 1,5-pentanediol; 1,6-hexanediol; resorcinol-di-(4-hydroxyethyl)ether; hydroquinone-di-(4-hydroxyethyl) ether; and combinations thereof. Preferred hydroxy-terminated curatives include ethylene glycol; diethylene glycol; 1,4-butanediol; 1,5-pentanediol; 1,6-hexanediol, trimethylol propane, and combinations thereof. Preferably, the hydroxy-terminated curative has a molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent. One commonly employed method, known in the art as a one-shot method, involves concurrent mixing of the polyisocyanate, polyol, and curing agent. This method results in a mixture that is inhomogeneous (more random) and affords the manufacturer less control over the molecular structure of the resultant composition. A preferred method of mixing is known as a pre-polymer method. In this method, the polyisocyanate and the polyol are mixed separately prior to addition of the curing agent. This method affords a more homogeneous mixture resulting in a more consistent polymer composition.

Suitable polyurethanes are further disclosed, for example, in U.S. Pat. Nos. 5,334,673, 6,506,851, 6,756,436, 6,867,279, 6,960,630, and 7,105,623, the entire disclosures of which are hereby incorporated herein by reference. Suitable polyureas are further disclosed, for example, in U.S. Pat. Nos. 5,484,870 and 6,835,794, and U.S. Patent Application No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

Cover compositions may also include one or more filler(s), such as coloring agents, fluorescent agents, whitening agents, antioxidants, dispersants, UV absorbers, light stabilizers, plasticizers, surfactants, compatibility agents, foaming agents, reinforcing agents, release agents, and the like.

Suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

The golf ball of this invention may have single-, dual-, or multi-layered covers preferably having an overall thickness within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In one embodiment, the cover is a single layer having a thickness of from 0.025 inches to 0.035 inches. Again, the cover hardness may be targeted depending on desired playing characteristics. As a general rule, when the ball has a relatively soft cover, the initial spin rate of the ball is relatively high and when the ball has a relatively hard cover, the initial spin rate of the ball is relatively low.

In the present invention, "compression" is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Cores having a very low stiffness will not cause the spring to deflect by more than 1.25 mm and therefore have a zero compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in J. Dalton.

In a golf ball if the invention, Coefficient of Restitution or COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. COR is then calculated as the ratio of the outgoing transit time period to the incoming transit time period, $COR=V_{out}/V_{in}=T_{in}/T_{out}$. The COR value can be targeted, for example, by varying the core peroxide and antioxidant types and amounts as well as the cure temperature and duration.

The surface hardness of a golf ball layer is obtained from the average of a number of measurements taken from opposing hemispheres, taking care to avoid making measurements on the parting line of the core or on surface defects such as holes or protrusions. Hardness measurements are made pursuant to ASTM D-2240 "Indentation Hardness of Rubber and Plastic by Means of a Durometer." Because of the curved surface of the golf ball layer, care must be taken to ensure that the golf ball or golf ball subassembly is centered under the durometer indentor before a surface hardness reading is obtained. A calibrated digital durometer, capable of reading to 0.1 hardness units, is used for all hardness measurements. The digital durometer must be attached to and its foot made parallel to the base of an automatic stand. The weight on the durometer and attack rate conforms to ASTM D-2240. It should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other.

It is understood that the golf balls of the invention incorporating a dissolvable tie layer and/or dissolvable layer as described and illustrated herein represent only some of the many embodiments of the invention. It is appreciated by those skilled in the art that various changes and additions can be made to such golf balls without departing from the spirit and scope of this invention. It is intended that all such embodiments be covered by the appended claims.

A golf ball of the invention may incorporate indicia, which as used herein, is considered to mean any symbol, letter, group of letters, design, or the like, that can be added to the dimpled surface of a golf ball.

It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL).

In any of these embodiments the single-layer core may be replaced with a 2 or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

What is claimed is:

1. A golf ball comprising:
   a first molded non-dissolvable layer having a first spherical outer surface;
   a dissolvable tie layer disposed concentrically about the first spherical outer surface by at least one of dipping, soaking, rolling, wiping, spraying, and brushing and being bonded with the first layer at an interface there between;
   a second molded non-dissolvable layer disposed concentrically about a second spherical outer surface of the dissolvable tie layer and being bonded with the dissolvable tie layer at an interface there between;
   wherein the dissolvable tie layer has a thickness of up to about 0.005 inches, and is formed from a tie layer composition consisting of a 1-50 percent aqueous mono-valent high acid ionomer dispersion;
   wherein the ionomer of the tie layer composition: (i) has an acid level greater than 18%; (ii) has more than 45% of acid groups that are neutralized with a monovalent cation; and (iii) is formed from an acid copolymer having a starting melt index of greater than 180 g/10 min.@190° C. with a 2160 g load;
   wherein the dissolvable tie layer is dispersible in water heated to a heating temperature of about 80° C.-90° C. or greater; and
   wherein the first molded non-dissolvable layer and the second molded non-dissolvable layer are not dispersible in water at the heating temperature.

2. The golf ball of claim 1, wherein the first molded non-dissolvable layer and the second molded non-dissolvable layer are different.

3. The golf ball of claim 1, wherein the first molded non-dissolvable layer and the second molded non-dissolvable layer are substantially similar.

4. The golf ball of claim 1, wherein the first molded non-dissolvable layer comprises a core, the dissolvable tie layer comprises an inner cover layer, and the second molded non-dissolvable layer comprises an outer cover layer.

5. The golf ball of claim 1, wherein the first molded non-dissolvable layer comprises an inner cover layer, the dissolvable tie layer comprises a second inner cover layer and the second molded non-dissolvable layer comprises an outer cover layer.

6. The golf ball of claim 1, wherein the monovalent cation is selected from the group consisting of Na, Li, and K.

* * * * *